May 16, 1972  A. E. BUTCHER  3,663,522
METHOD FOR MULTIPLE DIRECTION PINCH-OFF
Original Filed Nov. 14, 1967

INVENTOR.
A. E. BUTCHER
BY
*Young + Quigg*
ATTORNEYS

May 16, 1972 A. E. BUTCHER 3,663,522
METHOD FOR MULTIPLE DIRECTION PINCH-OFF
Original Filed Nov. 14, 1967 2 Sheets-Sheet 2

INVENTOR.
A. E. BUTCHER
BY
Young + Quigg
ATTORNEYS

United States Patent Office 3,663,522
Patented May 16, 1972

3,663,522
METHOD FOR MULTIPLE DIRECTION PINCH-OFF
Alvin E. Butcher, Bartlesville, Okla., assignor to Phillips Petroleum Company
Original application Nov. 14, 1967, Ser. No. 682,745, now Patent No. 3,524,218, dated Aug. 11, 1970. Divided and this application Feb. 5, 1970, Ser. No. 8,979
Int. Cl. B29c 17/02, 17/14; B29d 23/03
U.S. Cl. 264—94
6 Claims

ABSTRACT OF THE DISCLOSURE

A hollow thermoplastic parison is sealed off by means of radial pressure applied to a wall of the parison from the plurality of points to form a seal having a plurality of radial fusion lines, while at the same time applying pressure radially inward along a second plurality of points spaced alternately with the seal-forming plurality of points to thus fold the wall in at points beneath the fusion lines.

CROSS REFERENCE TO RELATED APPLICATION

This application is a divisional of copending application Ser. No. 682,745, filed Nov. 14, 1967 now U.S. 3,524,218.

BACKGROUND OF THE INVENTION

This invention relates to an improved method for multiple direction pinch-off for thermoplastic parisons. In the blow molding art it is known to pinch off a tubular parison with a plurality of jaw members moving toward a central point. A usual practice for forming articles by blow molding techniques from a molten thermoplastic material is to extrude said thermoplastic material into a tubular parison one end of which is closed and sealed prior to blowing the parison out against the walls of the mold. In such operations the thermoplastic material is in a thoroughly molten state and easily fuses to form an integral unit.

Thermoplastic materials, particularly polymers of at least one 1-olefin having from 2 to 8 carbon atoms per molecule, exhibit the peculiar phenomenon known as orientation when stretched at a temperature just below the crystalline melt point of the polymer. When oriented under these conditions, the oriented material has a strength of as much as 20 times that of the unoriented material. It is apparent that it would be desirable to take advantage of this characteristic of these thermoplastic materials in the fabrication of items by means of the blow molding technique. However, it is readily apparent that the temperature which is ideal for achieving the spectacular increase in tensile strength by means of orientation is not the ideal temperature for producing a good fusion weld of the parison.

It has been the general practice when attempting to form oriented articles from thermoplastic materials to extrude a tubular parison, cool the parison down to a temperature below its crystalline melting point and then reheat the parison to a temperature of about 1 to 50 degrees F. below its crystalline melt point, at which time the parison is sealed and pinched off at one end and placed within a mold cavity, and subjected to internal fluid pressure which causes the parison to expand and conform to the shape of the mold. In embodiments where biaxially oriented containers are desired, the parison is first stretched axially before being blown to conform to the shape of the mold. Since the parison at the time it is sealed and pinched off prior to blowing is in a partially crystalline condition at a temperature of about 1 to 50 degrees F. below its crystalline melt point it is readily apparent that achieving good fusion of the thermoplastic material so as to effect a seal which will not be a source of weakness in the finished article is likely to be quite difficult. Indeed it has been found that a simple pinching together of the parison is not adequate to effect a durable seal.

For this reason it has been felt desirable to use a multiple direction pinch-off for sealing such parisons. This technique has been found to give greatly improved seals. However, failures have been encountered, the failures generally being localized in areas near the outer extremities of the weld lines. This is particularly true when utilizing an axially moving stomping means comprising a rod to which is attached a flat stomping foot which is introduced into the neck of the bottle and descends down through the bottle contacting the inside bottom of the parison to apply pressure to the seal area. In these instances it is apparent that the stomper foot must be smaller than the inside diameter of the bottle neck when the article being molded is a container so as to make it possible to remove the bottle from the machine. Thus the portion of the fusion line which extends radially out beyond the area covered by the stomper foot for any substantial distance generally represent a weak area which can become a point of failure in the finished article.

BRIEF SUMMARY OF THE INVENTION

It is an object of this invention to form a blow molded article which is more resistant to failure in the pinch-off area. It is a further object of this invention to provide a multiple direction pinch-off with shorter fusion lines.

In accordance with this invention a multiple direction pinch-off device for sealing a hollow parison having a plurality of blade-carrying jaw members which reciprocate radially is provided with a plurality of tuck-in members alternating between said jaw members and displaced axially below said jaw members, said tuck-in members serving to fold in the walls of said parison.

BRIEF DESCRIPTION OF THE DRAWINGS

The drawings forming a part hereof in which like elements are designated by like reference characters in the various views.

DESCRIPTION OF THE PREFERRED EMBODIMENTS

Figure 1:
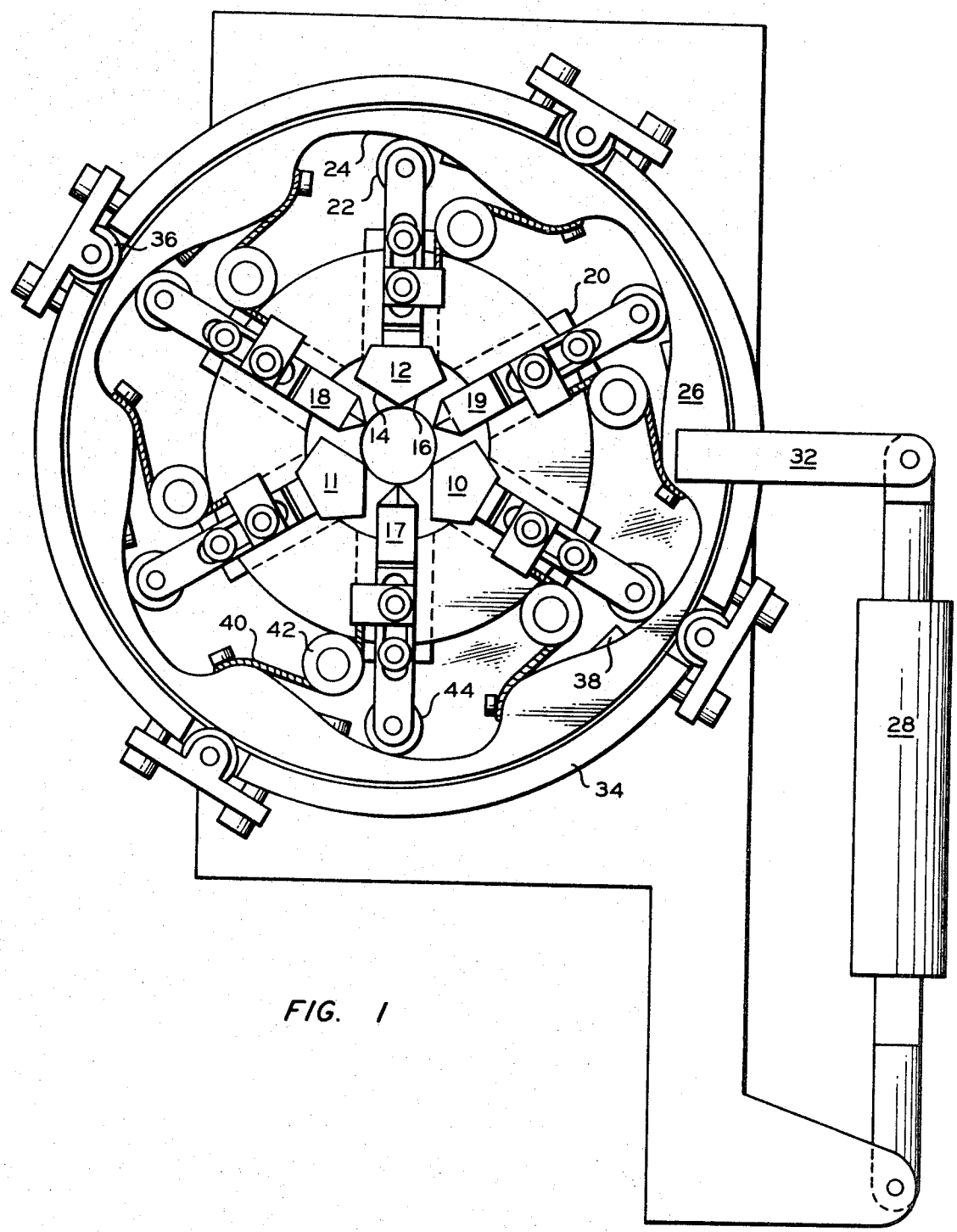
FIG. 1 is a plan view of apparatus in accordance with this invention.

The invention is applicable to sealing and pinching off of any hollow parison, but it is of special utility in sealing and pinching off temperature conditioned parisons in the production of biaxially oriented articles. In this connection it is of special utility in the production of biaxially oriented bottles from polymers of at least one 1-olefin having from 2 to 8 carbon atoms per molecule, particularly polymers of at least one 1-olefin selected from the group consisting of ethylene, propylene, butene and mixtures thereof.

The tuck-in members can be in the form of blades, wedge-shaped fingers, or the like. They can be made of metal or in instances where cooling the parison is undesirable, some low heat conductivity low coefficient of friction, high melting, material such as polytetrafluoroethylene, polytrifluorochloroethylene, and poly(fluorinated ethylene propylene). The blade-carrying jaw members are disposed radially around a central point. The tuck-in members are also disposed radially around the central point, said tuck-in members alternating with said jaw members, that is, around the circumference of the apparatus there will be a jaw member, a tuck-in member, a jaw member, another tuck-in member and so on. While there may be any number of jaw members in excess of one, in a preferred embodiment there are three jaw members and three tuck-in members. The tuck-in members are designed to cooperate with the blades of the jaw members in sealing the parison and are disposed below said jaw members such that the top of the tuck-in member is 0.01 to 0.5, preferably 0.02 to 0.1 inch below the top of the blade of the jaw member. It is apparent with larger and thicker parisons this distance would be greater while with smaller, thinner walled parisons the distance would be less. The tuck-in members may move radially in a plane exactly parallel with the plane of movement of the jaw members or they may move in a direction inwardly and upwardly toward a central point. In general the jaw members carrying the blades and the tuck-in members move radially inward and outward together, although it is possible to control the radial movement of each separately; for instance it is possible to move the tuck-in member axially back after the parison has been pinched off so as to allow removal of the pinched-off portion prior to the time the jaw members are retracted.

Any conventional method of achieving reciprocal motion of the jaw members and tuck-in members can be utilized, for instance cams, toggle arrangements and the like can be used.

Throughout this specification and the claims the term "below" is used in connection with the position of the tuck-in members to denote that they are disposed axially forward from the jaw members as viewed from the direction of the portion of the parison forming the bottle toward the portion of the parison which is pinched off and discarded. In a preferred arrangement the apparatus is disposed vertically. However, it is apparent in embodiments dealing with temperature conditioned parisons which are at a temperature just below their crystalline melt point, and thus self-supporting, it is possible for the entire apparatus to be disposed horizontally, or at any other angle.

Referring now to the figures, particularly FIG. 1, there is shown radially spaced jaw members 10, 11 and 12 carrying blades 14 and 16. Alternately disposed between said jaw members 10, 11 and 12 are radially disposed tuck-in members 17, 18 and 19. Each of said jaw members and tuck-in members is mounted in its respective slide 20. The jaw members of this embodiment are defined at their operating extremity by blades having an included angle 120° and at their other extremity by cam followers 22 which, in following cam surface 24 effect the radial reciprocal movement of said jaw members in response to rotation of cam plate 26 in response to the movement of cylinder 28 operating through linkage 32. As shown in FIG. 1, jaw members 10, 11, and 12 are mounted in slides 20 and are thereby radially movably attached to support housing 34 in which cam plate 26 rotates. Cam plate 26 is rotatably mounted in support housing 34 by means of suitable bearings 36 and 38. The jaw members 10, 11, and 12 are forced inwardly to coact with each other by virtue of counterclockwise rotation of the cam plate and are returned to open position by clockwise rotation of the cam plate due to the operation of the several cables 40 operating over suitable rollers 42 rotatably mounted on the support housing. Tuck-in members 17, 18, and 19 are reciprocated radially in response to rotation of cam plate 26 as a result of cam followers 44 riding against other parts of cam surface 24 in a manner similar to that for jaw members 10, 11, and 12.

Figure 2:
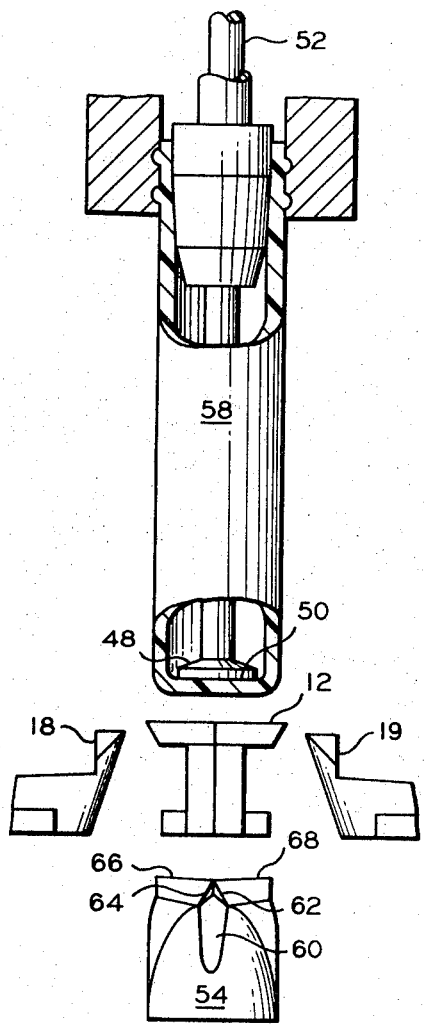
FIG. 2 is a view partially in section of an apparatus in accordance with the instant invention just after a parison has been severed.
Figure 4:
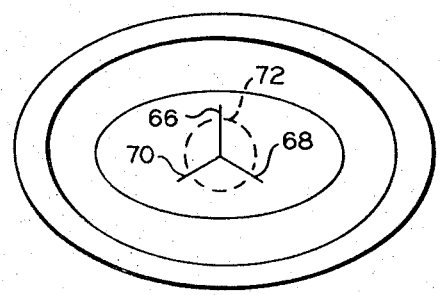
FIG. 4 is a view of the bottom of a bottle blown from a parison pinched off in accordance with the instant invention.

Referring now to FIG. 2, there is shown a preferred embodiment of the apparatus wherein an axially reciprocating stomping foot 48 having flat surface 50, carried by rod 52 is utilized in effecting a seal. In this view the operation is shown at a stage after the parison 54 has been severed, the lower portion removed and the upper portion 58 stretched by the downward movement of stomper foot 48. In the operation prior to the stage depicted in FIG. 2, jaw members 10, 11, and 12 and tuck-in members 17, 18, and 19 reciprocate radially inwardly to seal and pinch off parison 54. Jaw members 10 and 11 and tuck-in member 17 are not shown in this view. Stomper foot 48 then descends and presses against the closed inside bottom of the closed off parison to aid in forming a good seal. Referring now to FIGS. 1 and 2, the third tuck-in member 17 which is not shown in FIG. 2, which would extend outwardly from the plane of FIG. 2, pushes in on parison 54 to form fold 60. Tuck-in members 18 and 19 form similar folds. The cooperation of this third tuck-in member 17 and a blade of jaw member 10 squeezes the parison together to form flat sealed area 62. Similarly cooperation of tuck-in member 17 and a blade of jaw member 11 forms flat sealed area 64. It is further to be noted that there is a three-way cooperation between the jaw members, the tuck-in members, and stomper foot 48 to weld the plastic together along fusion lines 66, 68, and 70 as shown on FIGS. 2 and 4 at the point where the parison is severed. It is to be noted that the effect of the tuck-in blades is to restrict the total length of the fusion lines to a comparatively small value as compared with the total area of the bottom of the finished container. The area encompassed by stomper foot 48 is denoted by circular line 72, in FIG. 4, this area sometimes being visible because the cooling effect of the stomper foot results in greater clarity in this area. It can be seen that the effect of the tuck-in blades is to restrict the length of the fusion lines to a length almost within the area contacted by the stomper foot such that the stomper foot engages the entire area or at least substantially the entire area where fusion is being effected thereby making a better fusion joint. If the fusion lines extend out a substantial distance beyond the area contacted by the stomper foot a less satisfactory seal is effected.

Figure 3:
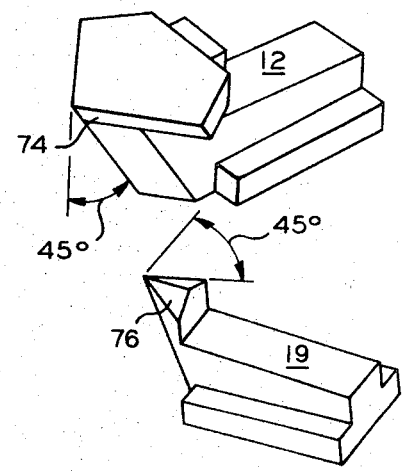
FIG. 3 is a detailed view of one of the several jaw members and one of the several tuck-in members.

Referring to FIG. 3 there are shown one of the three jaw members and one of the three tuck-in members in accordance with a preferred embodiment of the invention wherein the angle between the leading edge 74 of the blades of the jaw members with the vertical is 45°, and wherein tuck-in member 19 has surface 76 having an angle with a vertical of 45° so as to correspond to the angle of the leading edge of the blades. Other complementary angles can also be used. Surfaces 76 slope so as to give the tuck-in member a sharp ridge at the top, that is to give it a ttriangular shape.

Figure 5:
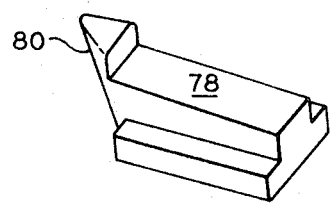
FIG. 5 is a perspective view of an alternate embodiment of the tuck-in member.

FIG. 5 shows another embodiment of the invention wherein the tuck-in member 78 slopes upwardly. It has been found that the configurations shown in FIGS. 3 and 5 result in a better distribution of the polymer in the sealed area. The end of the tuck-in member can be comparatively blunt as exemplified by rounded end 80 of member 78. This prevents the tuck-in member from digging into the parison with the result that excess material flows over the top of the tuck-in member.

In operation, as the blades of the jaw members apply inward radial pressure to the parison at a plurality of points to form a seal in the form of radial fusion lines, a plurality of tuck-in members fold in the wall of said parison at points beneath said fusion lines.

Many conventional parts such as supports, molds and the like have not been shown but are understood by those skilled in the art to be included and are within the scope of the invention.

EXAMPLE

Polypropylene of 0.905 density (ASTM D 1505–63T) and 2 melt flow (ASTM D 1238–62T), Condition L)

was extruded into tubing of 2.5 centimeters outside diameter with a wall thickness of 0.4 centimeter. This tubing was cooled to room temperature and cut into about 5-inch lengths. It was then reheated to 320–338° F. and one end was grasped by a thread forming means such as is shown in FIG. 2. The bottom was then sealed off with a three-way pinch-off using three alternate tuck-in members as shown in FIG. 2. The stomper foot and pinch-off means was then moved down relative to the gripping means to stretch the parison as shown in FIG. 2. It was then blown to form a bottle. Each of the fusion lines shown in FIG. 4 extended radially for 1.2 centimeters thus defining a diameter of 2.4 centimeters which was slightly less than the original outside diameter of the parison. The bottom of the finished bottle was oval shaped measuring about 7 centimeters by 5 centimeters.

For a control an identical parison was temperature conditioned in an identical manner, placed in the identical apparatus, pinched off with an identical three-way pinch-off except without the tuck-in blades, stretched and blown into an identical bottle as in the example. The fusion lines extended a radial distance of 1.5 centimeters thus defining a diameter of 3.0 centimeters which was more than the original outside diameter of the parison.

While this invention has been described in detail for the purpose of illustration, it is not to be construed as limited thereby but is intended to cover all changes and modifications within the spirit and scope thereof.

I claim:

1. In a method of sealing off a hollow parison wherein inward radial pressure is applied to a wall of said parison from a first plurality of points to form a seal having a plurality of radical fusion lines, the improvement comprising applying pressure radially inward from a second plurality of points spaced alternately with, and offset slightly from, said first plurality of points to thus fold said wall in at points beneath said fusion lines during the formation of said seal.

2. The method according to claim 1 wherein axial pressure is applied, after said sealing off, to the inside of said parison at a point above said fusion lines.

3. The method according to claim 1 wherein said parison comprises polypropylene and is at a temperature of 320–338° F. at the time said seal is formed.

4. The method according to claim 1 wherein said parison is in a partially crystalline condition at a temperature of 1 to 50° F. below its crystalline melt point at the time said seal is formed.

5. The method according to claim 4 wherein said parison comprises a polymer of at least one 1-olefin having 2–8 carbon atoms per molecule.

6. The method according to claim 4 wherein said parison comprises polypropylene.

References Cited
UNITED STATES PATENTS

| | | | |
|---|---|---|---|
| 3,390,426 | 7/1968 | Turner et al. | 264—99 |
| 3,478,388 | 11/1969 | Turner | 264—163 |
| 3,520,010 | 7/1970 | Dockery | 264—98 |
| 3,514,812 | 6/1970 | Evers | 264—94 |

FOREIGN PATENTS

| | | | |
|---|---|---|---|
| 1,178,580 | 9/1961 | Germany | 264—98 |

ROBERT F. WHITE, Primary Examiner

J. R. THURLOW, Assistant Examiner

U.S. Cl. X.R.

18—5 BQ; 264—98, 150, 163, 210, 296